(12) United States Patent
Ju et al.

(10) Patent No.: US 11,112,885 B2
(45) Date of Patent: Sep. 7, 2021

(54) ROTARY INPUT DEVICE

(71) Applicant: Acer Incorporated, New Taipei (TW)

(72) Inventors: Tai Ju, New Taipei (TW); Chueh-Pin Ko, New Taipei (TW); Chih-Chiang Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 244 days.

(21) Appl. No.: 16/422,985

(22) Filed: May 25, 2019

(65) Prior Publication Data
US 2020/0004345 A1    Jan. 2, 2020

(30) Foreign Application Priority Data
Jun. 27, 2018 (TW) ................... 107122074

(51) Int. Cl.
| | |
|---|---|
| H01H 9/00 | (2006.01) |
| G06F 3/033 | (2013.01) |
| G01D 5/14 | (2006.01) |
| H01H 36/00 | (2006.01) |

(52) U.S. Cl.
CPC ............. *G06F 3/033* (2013.01); *G01D 5/145* (2013.01); *H01H 36/00* (2013.01)

(58) Field of Classification Search
CPC ......... H03K 17/97; H03K 2217/94068; H01H 25/065; H01H 36/00; G06F 3/0362; G06F 3/0487; G06F 3/033; G01D 5/145
USPC ....................................................... 225/207
See application file for complete search history.

(56) References Cited

U.S. PATENT DOCUMENTS

| | | | | |
|---|---|---|---|---|
| 4,176,782 | A * | 12/1979 | Fukuda | G06K 7/087 |
| | | | | 235/449 |
| 8,138,865 | B2 * | 3/2012 | North | G05G 5/06 |
| | | | | 335/205 |
| 8,344,834 | B2 * | 1/2013 | Niiyama | G06F 3/0338 |
| | | | | 335/207 |
| 9,093,237 | B2 * | 7/2015 | Bondar | H01F 7/0247 |
| 2006/0250377 | A1 * | 11/2006 | Zadesky | G06F 3/0338 |
| | | | | 345/173 |
| 2016/0091930 | A1 * | 3/2016 | Chen | G06F 1/1643 |
| | | | | 345/173 |
| 2017/0344133 | A1 * | 11/2017 | Kang | H01H 19/14 |
| 2017/0350725 | A1 * | 12/2017 | Edwards | G01D 5/147 |
| 2019/0288687 | A1 * | 9/2019 | Ju | G06F 3/0362 |
| 2020/0174585 | A1 * | 6/2020 | Ju | G06F 3/0362 |

* cited by examiner

*Primary Examiner* — Shawki S Ismail
*Assistant Examiner* — Lisa N Homza
(74) *Attorney, Agent, or Firm* — McClure, Qualey & Rodack, LLP

(57) ABSTRACT

A rotary input device includes a base, a cover, a column, one or more first magnets, one or more second magnets, a plurality of magnetic sensors, and a signal processing circuit. The cover includes a cap portion and a side wall vertically extending from the cap portion. The column surrounded by the side wall includes a first end for connecting to the base and a second end for connecting to the cover. The first magnet surrounds the column and is configured on the cover. The second magnet surrounds the first magnet and is configured on the base. The magnetic sensors are configured on a lateral surface of the column and coupled to the signal processing circuit.

20 Claims, 11 Drawing Sheets

ROTARY INPUT DEVICE

CROSS REFERENCE TO RELATED APPLICATIONS

This Application claims priority of Taiwan Patent Application No. 107122074, filed on Jun. 27, 2018, the entirety of which is incorporated by reference herein.

BACKGROUND OF THE INVENTION

Field of the Invention

The present invention relates to a rotary input device using the same, and more particularly to a magnetic sensing rotary input device that is capable of receiving many kinds of input operations.

Description of the Related Art

With the popularization of various devices using touch panels, different types of auxiliary input devices have been developed, such as the stylus. These devices allow the user to have more ways to operate his device and input data into it. For example, a user can input a confirmation command to an electronic product by pressing a rotary input device, or select an option on a menu by rotating the rotary input device. Therefore, how to improve the mechanical structure and circuit design of the rotary input device to meet the needs of the user is also a problem that urgently needs to be solved.

BRIEF SUMMARY OF THE INVENTION

A detailed description is given in the following embodiments with reference to the accompanying drawings.

The present invention has been made in view of the above problems, and proposes a magnetic sensing rotary input device that can receive many kinds of input.

In the first embodiment, the present invention provides a rotary input device, including a base, a cover, a column, one or more first magnets, one or more second magnets, a plurality of magnetic sensors, and a signal processing circuit. The cover has a cap portion and a side wall vertically extending from the cap portion. The column is surrounded by the side wall and has a first end for connecting to the base and a second end for connecting to the cover. The first magnets surround the column and are configured on either the base or the cover. The second magnets surround the first magnets and are configured on the other of the base or the cover. The plurality of magnetic sensors are configured on a lateral surface of the column. The signal processing circuit is coupled to the magnetic sensors. When the cover is rotated relative to the base, the following operation will be performed: the magnets rotate around the column and the magnetic sensors; the magnetic sensors sense a plurality of magnetic signals having different values correspondingly; and the signal processing circuit determines a relative rotation direction of the cover and the base according to the plurality of magnetic signals sensed by the magnetic sensors, and outputs a clockwise rotation signal or a counterclockwise rotation signal. When the cover is moved horizontally or obliquely relative to the base, the following operation will be performed: a portion of the first magnets are moved close to the column, and the magnetic sensors sense the magnetic signals of the part of the magnetic sensors to be decreased; the other portion of the first magnets are moved away from the column, and the magnetic sensors sense the magnetic signals of the other portion of the magnetic sensors to be increased; and the signal processing circuit determines the relative movement direction of the cover and the base according to the plurality of magnetic signals sensed by the magnetic sensors, and outputs a movement signal.

In the second embodiment, the first magnets are opposite to the second magnets with the same polarity.

In the third embodiment, the first magnets include a single magnet that spirally surrounds the column.

In the fourth embodiment, the first magnets include a plurality of magnets having the same magnetic field strength, the plurality of magnets spirally surround the column.

In the fifth embodiment, the first magnets include a plurality of magnets surrounding the column. The plurality of magnets are respectively the same distance from the column, and the plurality of magnetic fields of the plurality of magnets monotonically increase or decrease in a clockwise direction.

In the sixth embodiment, the column is fixedly coupled to the base and rotatably and movably coupled to the cover. The first magnets are disposed on the cover and surround the column, and the second magnets are disposed on the base and surround the first magnets.

In the seventh embodiment, the column is fixedly coupled to the cover and rotatably and movably coupled to the base. The first magnets are disposed on the base and surround the column, and the second magnets are disposed on the cover and surround the first magnets.

In the eighth embodiment, the rotary input device further includes a push switch electrically connected to the signal processing circuit and disposed between the cover and the column. When the cover is pressed to approach the base, the push switch is triggered, and the signal processing circuit determines that the push switch is triggered and outputs a pressing signal.

In the ninth embodiment, the rotary input device further includes a push switch electrically connected to the signal processing circuit and disposed between the column and the base. When the cover is pressed to approach the base, the push switch is triggered, and the signal processing circuit determines that the push switch is triggered and outputs a pressing signal.

In the tenth embodiment, when the cover is pressed to be close to the base, the relative positions of the plurality of magnetic sensors and the first magnets are misplaced, and the signal processing circuit determines that a relative position of the cover and the base is closer according to the plurality of magnetic signals sensed by the plurality of magnetic sensors, and outputs a pressing signal.

With the above embodiments, the present invention proposes a magnetic sensing rotary input device or an operating system using the same that can receive many kinds of input operations to increase functionality and convenience, and provides more diverse input modes for the user.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
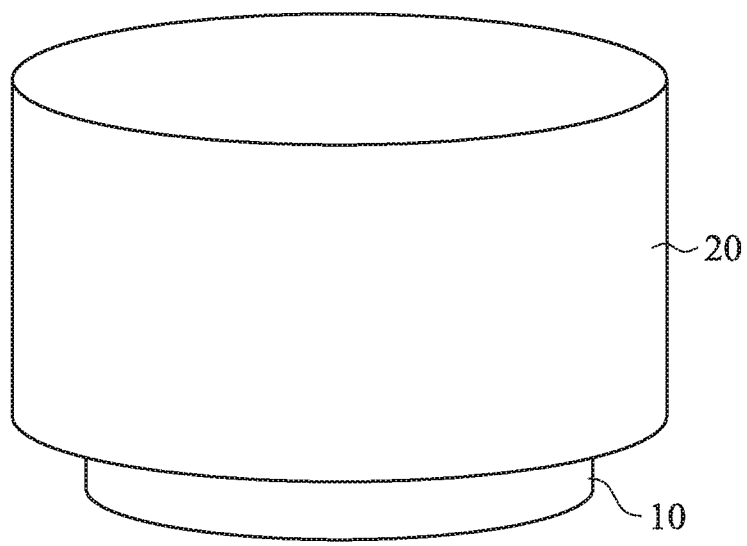
FIG. 1 shows a perspective view of a rotary input device in accordance with an embodiment of the present invention.

The following description provides many different embodiments or examples for implementing different features of the disclosure. Elements and arrangements in the examples below are merely used for concisely describing the present disclosure, which are not intended to limit the present disclosure. For example, the description of a structure in which a first feature is on or above a second feature includes that the first feature and the second feature are in direct contact with each other or there is another feature disposed between the first feature and the second feature such that the first feature and the second feature are not in direct contact.

The terms "first" and "second" of this specification are used only for the purpose of clear explanation and are not intended to limit the scope of the patent. In addition, terms such as "the first feature" and "the second feature" are not limited to the same or different features.

Spatially related terms, such as upper or lower, are used herein merely to describe briefly the relationship of one element or feature to another element or feature in the drawings. In addition to the directions described in the drawings, there are devices that are used or operated in different directions. The shapes, dimensions, and thicknesses in the drawings may not be drawn to scale or may be simplified for clarity of illustration, and are provided for illustrative purposes only.

FIG. 1 shows a perspective view of a rotary input device 1 in accordance with an embodiment of the present invention. As shown in FIG. 1, the rotary input device 1 of the present invention includes a base 10 and a cover 20 that covers the base 10. The cover 20 may be pressed toward the base 10, rotated relative to the base 10, or moved horizontally or obliquely relative to the base 10.

When the rotary input device 1 is placed on a device with a touch screen, the rotary input device 1 communicates with the device so that the input of the rotary input device 1 can operate according to the image displayed on the touch screen. For example, when the rotary input device 1 and the device with a touch screen are connected through WIFI or Bluetooth, the touch screen may display a menu accordingly. The user selects the desired option by rotating or operating the rotary input device 1 like a joystick, and makes a confirmation by pressing the rotary input device 1. In another embodiment, the bottom surface of the base 10 may also include a predetermined electrode pattern. By setting the electrode pattern, different types of touch signals generated between the electrode pattern and the touch screen are used to represent different kinds of input signals. For example, the electrode pattern is set to be or not to be in contact with the touch screen, the electrode pattern is set to generate different voltage signals, or the conductivity of the electrode pattern is set, so that the rotary input device 1 generates different kinds of input signals to the touch screen.

Figure 2A:
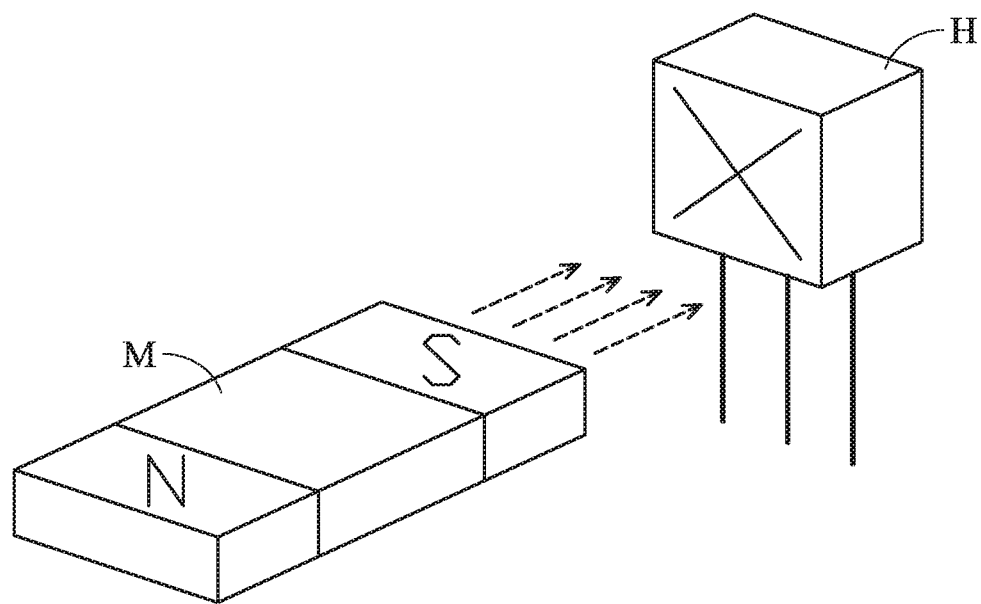
FIG. 2A shows a schematic view of a magnet and a magnetic sensor.
Figure 2B:
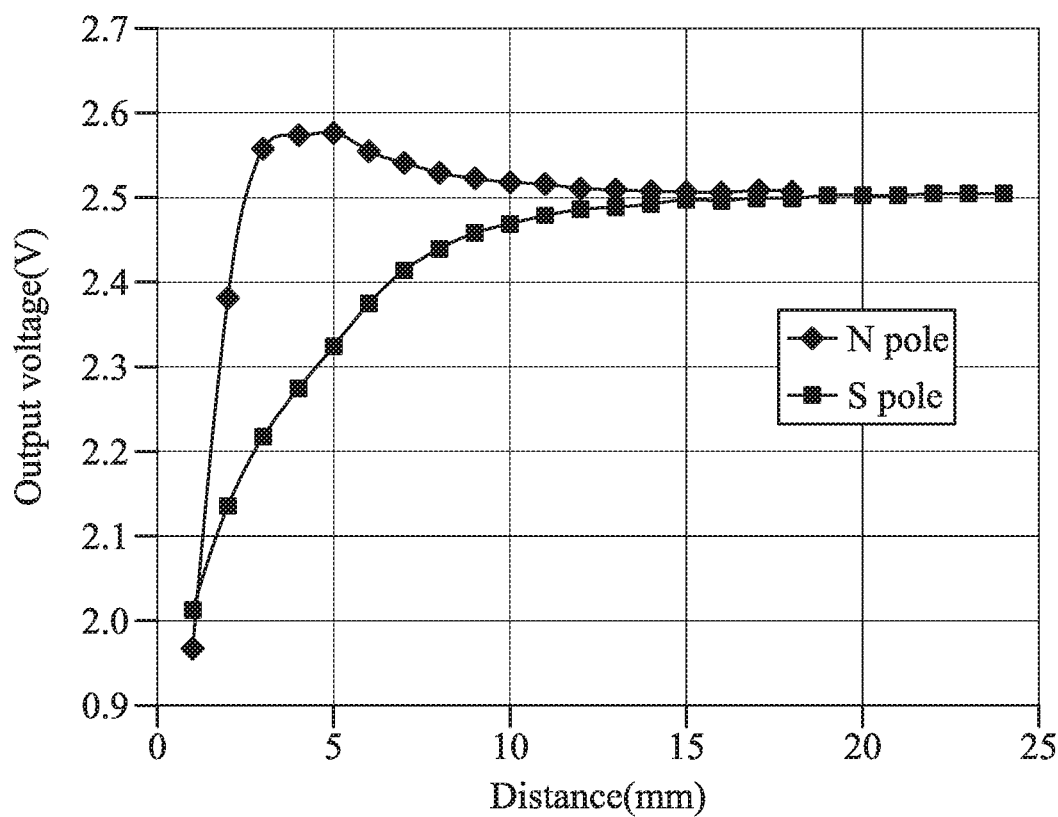
FIG. 2B shows a plot of the distance between the magnet and the magnetic sensor relative to the voltage output by the magnetic sensor.

In the following embodiments, the magnetic sensing technique is used as a detecting technique for distinguishing various input operations by the rotary input device. FIG. 2A shows a schematic view of a magnet and a magnetic sensor. FIG. 2B shows a plot of the distance between the magnet and the magnetic sensor relative to the voltage output by the magnetic sensor. In the embodiment of FIG. 2A, the magnetic sensor H can be implemented by using a Hall Effect sensor or the like. When the distance between the magnet M and the magnetic sensor H is different or the polarity of the magnet M is different, the magnetic field strength sensed by the magnetic sensor H is also different, and the voltage output by the magnetic sensor H also changes accordingly. As shown in FIG. 2B, the horizontal axis represents the distance of the magnet M from the magnetic sensor H, and the vertical axis represents the output voltage of the magnetic sensor H. In FIG. 2B, a plot of the output voltage of the magnetic sensor H versus the distance between the N pole of the magnet M and the magnetic sensor H is drawn, and a plot of the output voltage of the magnetic sensor H versus the distance between the S pole of the magnet M and the magnetic sensor H is drawn. In the present embodiment, since the output voltage and the distance between the N pole of the magnet M and the magnetic sensor H do not maintain a uniform change trend (As the distance between the N pole of the magnet M and the magnetic sensor H increases, the corresponding output voltage of the magnetic sensor H rises first and then falls), the range of the output voltage used to detect the distance is small. Therefore, the following embodiment uses the S pole of the magnet M to sense the change of the magnetic force, so that the description is more concise and clear. In another embodiment, if the characteristic of the magnetic sensor H is different or the distance between the N pole of the magnet M and the magnetic sensor H is appropriately set, the combination of the N pole of the magnet M and the magnetic sensor H can also be used to achieve the embodiments of the rotary input device described later.

In the following embodiments, the rotary input device 1 further includes a column that is fixedly connected to either the base 10 or the cover 20 and rotatably connected to the other of the base 10 or the cover 20. The base 10 and the cover 20 can be relatively moved horizontally or obliquely. Therefore, when the column is fixedly connected to the base 10 and the cover 20 is rotated or moved relative to the base 10, the cover 20 and the column are also relatively rotated or moved. When the column is fixedly connected to the cover 20 and the cover 20 is rotated or moved relative to the base 10, the base 10 and the column are also relatively rotated or moved. Furthermore, a magnetic sensor H is disposed on the lateral surface of the column and the magnet M is disposed on the base 10 and/or the cover 20. When the cover 20 is rotated or moved relative to the base 10, the magnet M will rotate or move relative to the column and the magnetic sensor H. The magnetic sensor H will sense magnetic signals of different magnitudes. By judging the change in intensity between the magnetic signals, the rotary input device 1 can accordingly output a clockwise rotation signal, a counterclockwise rotation signal or a movement signal representing a relative movement between the base 10 and the cover 20.

Figure 3A:
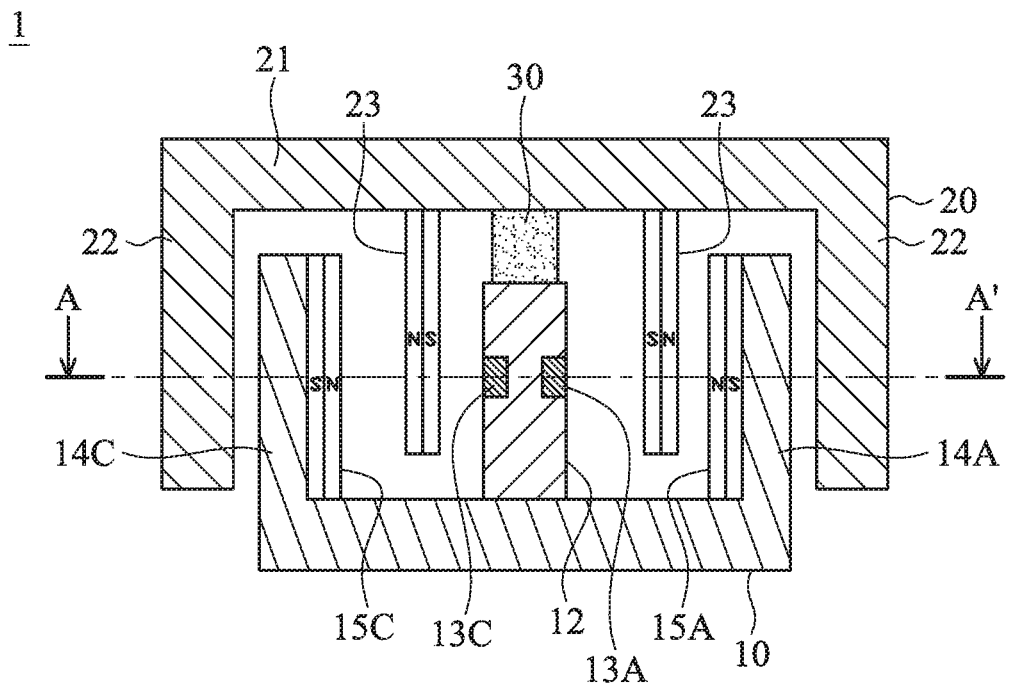
FIG. 3A is a longitudinal sectional view showing a rotary input device in accordance with another embodiment of the present invention.
Figure 3B:
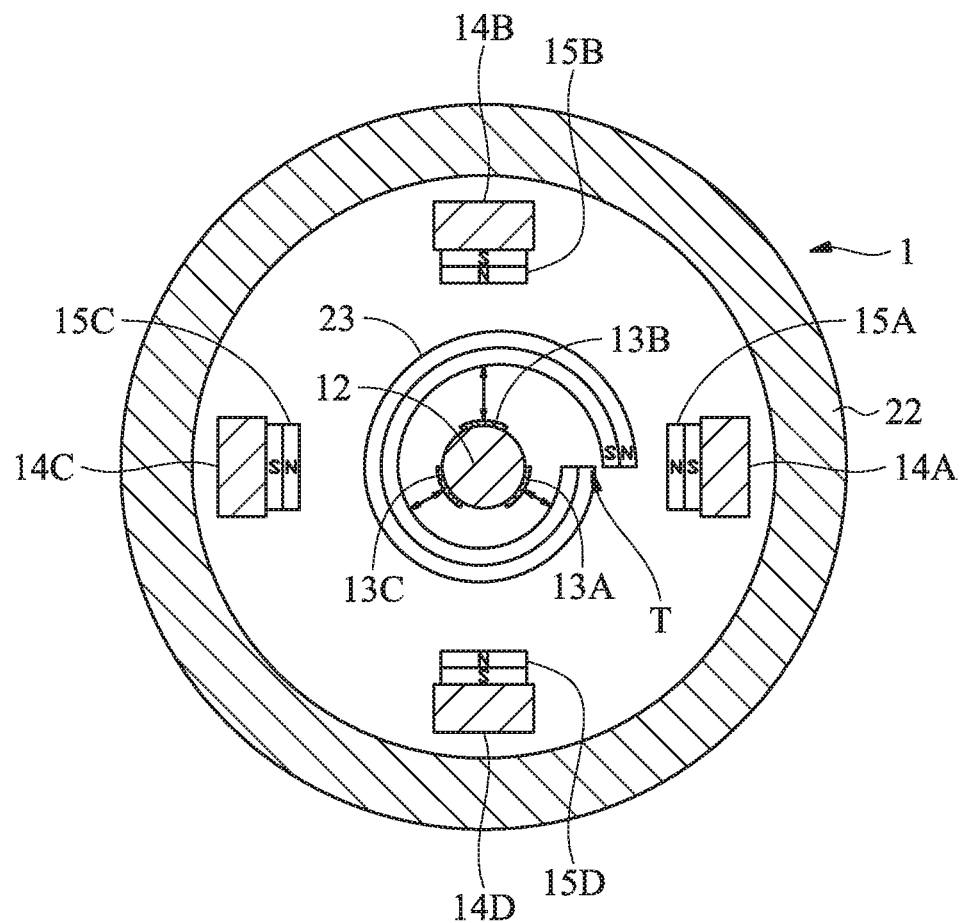
FIG. 3B is a plan view showing the cross section of the rotary input device of FIG. 3A taken along line A-A'.

FIG. 3A is a longitudinal sectional view showing a rotary input device 1 in accordance with another embodiment of the present invention. FIG. 3B is a plan view showing the cross section of the rotary input device 1 of FIG. 3A taken along line A-A'. In this embodiment, the detailed structure of the rotary input device 1 is as shown in FIGS. 3A and 3B, and the rotary input device 1 includes a base 10, a column 12, magnetic sensor 13A, 13B, 13C, a first magnet 23, second magnet 15A, 15B, 15C, 15D, a cover 20, and a signal processing circuit (not shown). The outer surface of the base 10 may be provided with members such as an adsorbing member or a magnet (not shown) to provide an adsorption function. Therefore, the base 10 can be fixed to a device to be operated. The outer surface of the base 10 may also be provided with an electrode pattern (not shown). The electrode pattern is disposed in contact with the device capable of sensing the electrode pattern so as to transmit or receive signals. In the present embodiment, a first end of the column 12 is fixedly connected to the inner surface of the base 10, and a second end of the column 12 is rotatably connected to the cover 20. The base 10 and the cover 20 can be relatively moved horizontally or obliquely. The magnetic sensors 13A, 13B, and 13C are disposed on the side surface of the column 12 to detect the magnetic force. Each of the magnetic sensors 13A, 13B, and 13C can be implemented by Hall sensor or the like, which outputs voltage accordingly according to the magnetic field strength that is sensed. The signal processing circuit can be implemented by a microprocessor, a microcontroller, a digital signal processor, and a special application integrated circuit. The signal processing circuit is coupled to the magnetic sensors 13A, 13B, and 13C. The signal processing circuit determines a corresponding signal that the rotary input device 1 should output based on the change in the output voltage of the magnetic sensors 13A, 13B, and 13C. In this embodiment, the base 10 and the column 12 are in a cylindrical shape. In other embodiments, the base 10 and the column 12 may be in other appropriate shapes or sizes (for example, a triangle or a square), only if the relative rotation between the cover 20 and the base 10 is not hindered. In addition, the side surface of the column 12 may also be provided with a groove to accommodate the magnetic sensors 13A, 13B, and 13C, or the magnetic sensors 13A, 13B, and 13C may be covered under the surface of the side surface of the column 12.

In the present embodiment, the cover 20 includes a cap portion 21 and a side wall 22 vertically extending from the cap portion 21. The inner surface of the cap portion 21 is rotatably and movably connected to the second end of the column 12, and the column 12 is surrounded by the side wall 22. For example, the cap portion 21 and the column 12 may have an axis and a corresponding receiving hole (none of which are shown) to achieve a rotatable connection. In the present embodiment, the first magnet 23 is disposed along the circumferential direction or the column 12 to spirally surround the column 12. The first magnet 23 can be fixed to the cap 21 by an adhesive or a connecting member. As shown in FIG. 3B, the first magnet 23 gradually approaches the column 12 in the counterclockwise direction. The side of the first magnet 23 facing the column 12 is disposed with the S pole of the first magnet 23, and the side of the first magnet 23 facing the side wall 22 is disposed with the N pole of the first magnet 23. The magnetic field strength of the first magnet 23 on the side facing the column 12 is set to be uniform. The magnetic field strength sensed by the magnetic sensors 13A, 13B, and 13C is mainly determined by the distance between the magnetic sensors 13A, 13B, and 13C and the first magnet 23. In other embodiments, the cap portion 21 and the side wall 22 of the cover 20 may also be of different shapes or sizes depending on design considerations such as ergonomics. For example, the outer surface of the cap portion 21 and the outer surface of the side wall 22 may be disposed with a recessed area for facilitating the user's finger pressing or holding. There may also be different angles between the side wall 22 and the cap portion 21. The cap portion 21 and the side wall 22 may not be completely sealed. In other embodiments, the first magnet 23 may gradually approaches the column 12 in the clockwise direction.

In the present embodiment, the base 10 includes side walls 14A, 14B, 14C, and 14D spaced apart from each other and extending upward from the inner surface of the base 10 and spaced apart. The column 12 is surrounded by side walls 14A, 14B, 14C, and 14D, which are surrounded by the side walls 22. In the present embodiment, the second magnets 15A, 15B, 15C, and 15D are provided on the inner circumferential surfaces of the side walls 14A, 14B, 14C, and 14D, respectively. The second magnets 15A, 15B, 15C, and 15D and the first magnets 23 are opposed to each other by the same magnetic pole, that is, when the S pole of the first magnet 23 faces the column 12 and the N pole faces outward, each of the second magnets 15A, 15B, 15C, and 15D faces the first magnet 23 with an N pole. In another embodiment, the side walls 14A, 14B, 14C, and 14D may also be replaced by a single ring-shaped side wall, in which case the second magnets 15A, 15B, 15C, and 15D may also be replaced by a single ring-shaped magnet. In another embodiment, the side walls 14A, 14B, 14C, and 14D may be omitted, and the second magnets 15A, 15B, 15C, and 15D may be directly connected to the base 10, and the second magnets 15A, 15B, 15C, and 15D can be fixed to the base 10 by an adhesive or a connecting member. In another embodiment, the side walls 14A, 14B, 14C, and 14D may be omitted and the second magnets 15A, 15B, 15C, and 15D may be implemented using a single ring-shaped magnet.

In the present embodiment, an elastic body 30 is further disposed between the column 12 and the cap portion 21. When the cover 20 is pressed, the base 10 and the cover 20 can approach each other by the compression elastic body 30. In addition, the rotary input device 1 may further include a push switch (not shown) electrically connected to the signal processing circuit for detecting a pressing operation of the user, so that the signal processing circuit can output a pressing signal accordingly. For example, the push switch can be disposed at the elastic body 30. When the user presses the cover 20, the elastic body 30 is compressed so that the distance between the cover 20 and the base 10 becomes close and the push switch is triggered. The signal processing circuit determines that the push switch is triggered, and outputs a pressing signal accordingly. When the pressing force applied to the rotary input device 1 disappears, the base 10 and the cover 20 are returned to the preset distance due to the elastic force of the elastic body 30, and the push switch is in an un-triggered state.

In a state where the rotary input device 1 is not applied with a force (in a state not operated by the user), as shown in FIG. 3A, sensing surfaces of the magnetic sensors 13A, 13B, and 13C (i.e., areas of the magnetic sensors 13A, 13B, and 13C that are mainly used for detecting the magnetic field) face the first magnet 23. As also shown in FIG. 3B, the first magnet 23 has a spiral structure that gradually approaches the column 12 along the counterclockwise direction. The magnetic field strength sensed by the magnetic sensors 13A, 13B, and 13C is varied by the distance between the sensing surfaces of the magnetic sensors 13A, 13B, 13C, and the helical first magnet 23 (for example, the length of the arrow in FIG. 3B). The closer the magnetic sensors 13A, 13B, and 13C are to the helical first magnet 23, the stronger the magnetic field strength is sensed and the lower the voltage that is output. Conversely, the farther the magnetic sensors 13A, 13B, and 13C are from the helical first magnet 23, the weaker the magnetic field strength is sensed and the higher the voltage that is output.

In the embodiment of FIG. 3B, when the user rotates the rotary input device 1 in the clockwise direction, the cover 20 rotates clockwise relative to the base 10, and the first magnet 23 rotates clockwise with the cover 20. The distance between the magnetic sensors 13A, 13B, 13C and the first magnet 23 is gradually decreased, the magnetic field strength sensed by the magnetic sensors 13A, 13B, and 13C is gradually increased, and the corresponding magnetic signal (i.e., the output voltage) is gradually decreased. According to the gradual decrease of the magnetic signal output by the magnetic sensors 13A, 13B, and 13C, the signal processing circuit accordingly outputs a clockwise rotation signal to the external device. In addition, in order to improve the accuracy of the detection, the magnetic sensors 13A, 13B, and 13C can be set to sense the enhanced magnetic field strength at least two consecutive times, so that the magnetic sensors 13A, 13B, and 13C decrease the magnetic signal at least two consecutive times. Then the signal processing circuit determines that the rotary input device 1 is rotated in the clockwise direction and outputs a clockwise rotation signal to the external device. On the other hand, when the user rotates the rotary input device 1 in the counterclockwise direction, the cover 20 rotates counter-clockwise relative to the base 10, and the first magnet 23 rotates counterclockwise with the cover 20. The distance between the magnetic sensors 13A, 13B, 13C, and the first magnet 23 is gradually increased, the magnetic field strength sensed by the magnetic sensors 13A, 13B, and 13C is gradually decreased, and the corresponding magnetic signal (i.e., the output voltage) is gradually increased. According to the gradual increase of the magnetic signal output by the magnetic sensors 13A, 13B, and 13C, the signal processing circuit accordingly outputs a counterclockwise rotation signal to the external device. In addition, in order to improve the accuracy of the detection, the magnetic sensors 13A, 13B, and 13C can be set to sense the weakened magnetic field strength at least two consecutive times, so that the magnetic sensors 13A, 13B, and 13C increase the magnetic signal at least two consecutive times. Then the signal processing circuit determines that the rotary input device 1 is rotated in the counterclockwise direction and outputs a counterclockwise rotation signal to the external device. Furthermore, the signal processing circuit can also determine the rotation angle of the rotary input device 1 based on how much the magnetic signal output from the magnetic sensors 13A, 13B, and 13C has changed. At the end T where the first magnet 23 is farthest from and closest to the column 12, the change in the distance between the magnetic sensors 13A, 13B, 13C, and the first magnet 23 is a sudden increase along the counterclockwise direction, which is different from that at the other portions that is monotonically decreased along the counterclockwise direction. Therefore, using an algorithm, the signal processing circuit can treat this region as a special case to output a correct clockwise rotation signal or a counterclockwise rotation signal. For example, only when the output voltages of the magnetic sensors 13A, 13B, and 13C are increased or decreased two consecutive times does the signal processing circuit determine whether to output a clockwise rotation signal or a counterclockwise rotation signal.

In the embodiment of FIGS. 3A and 3B, for example, when the user pushes the rotary input device 1 to the left side in the horizontal direction, the cover 20 moves horizontally or obliquely to the left side with respect to the base 10, and the first magnet 23 follows the cover 20 moving to the left side. The magnetic sensor 13A senses an increased magnetic field strength due to a decrease in the distance between the first magnet 23 and the magnetic sensor 13A, and the magnetic signal output from the magnetic sensor 13A is decreased. At the same time, the magnetic sensors 13B and 13C sense decreased magnetic field strength due to the increase in the distance between the first magnet 23 and the magnetic sensors 13B and 13C, and the magnetic signals output from the magnetic sensors 13B and 13C are increased. The signal processing circuit correspondingly outputs a leftward movement signal to the external device in accordance with the increase and decrease of the magnetic signals outputted by the respective magnetic sensors 13A, 13B, and 13C. On the other hand, when the user pushes the rotary input device 1 to the lower side in the horizontal direction, the cover 20 moves horizontally or obliquely to the lower side with respect to the base 10, and the first magnet 23 follows the cover 20 moving to the lower side. The magnetic sensor 13B senses an increased magnetic field strength due to a decrease in the distance between the first magnet 23 and the magnetic sensor 13B, and the magnetic signal output from the magnetic sensor 13B is decreased. At the same time, the magnetic sensors 13A and 13C sense decreased magnetic field strength due to the increase in the distance between the first magnet 23 and the magnetic sensors 13A and 13C, and the magnetic signals output from the magnetic sensors 13A and 13C are increased. The signal processing circuit correspondingly outputs a downward movement signal to the external device in accordance with the increase and decrease of the magnetic signals outputted by the respective magnetic sensors 13A, 13B, and 13C. That is, the signal processing circuit can determine that the rotary input device 1 is being moved according to decreased magnetic signals outputted from some of the plurality of magnetic sensors 13A, 13B, and 13C and increased signals outputted from the other of the plurality of magnetic sensors 13A, 13B, and 13C. Further, the signal processing circuit can determine the direction in which the cover 20 is moved relative to the base 10 according to from which of the magnetic sensors 13A, 13B, and 13C the increased magnetic signals and the decreased magnetic signals are output respectively. For example, when the magnetic signals of the magnetic sensors 13A and 13B increase, and the magnetic signal of the magnetic sensor 13C decreases, the signal processing circuit determines there is a relative movement between the cover 20 and the base 10. Regarding the direction of the relative movement, the signal processing circuit can further judge based on the magnetic signals output by the magnetic sensors 13A, 13B, and 13C. When the external force moving the rotary input device 1 disappears, the first magnet 23 is pushed back to the preset position due to the repulsive force generated between the N pole of the first magnet 23 facing the outer side and the N poles of the second magnet 15A, 15B, 15C, and 15D facing the inner side. The cover 20 is returned to the state in which the base 10 is not pushed.

Figure 4A:
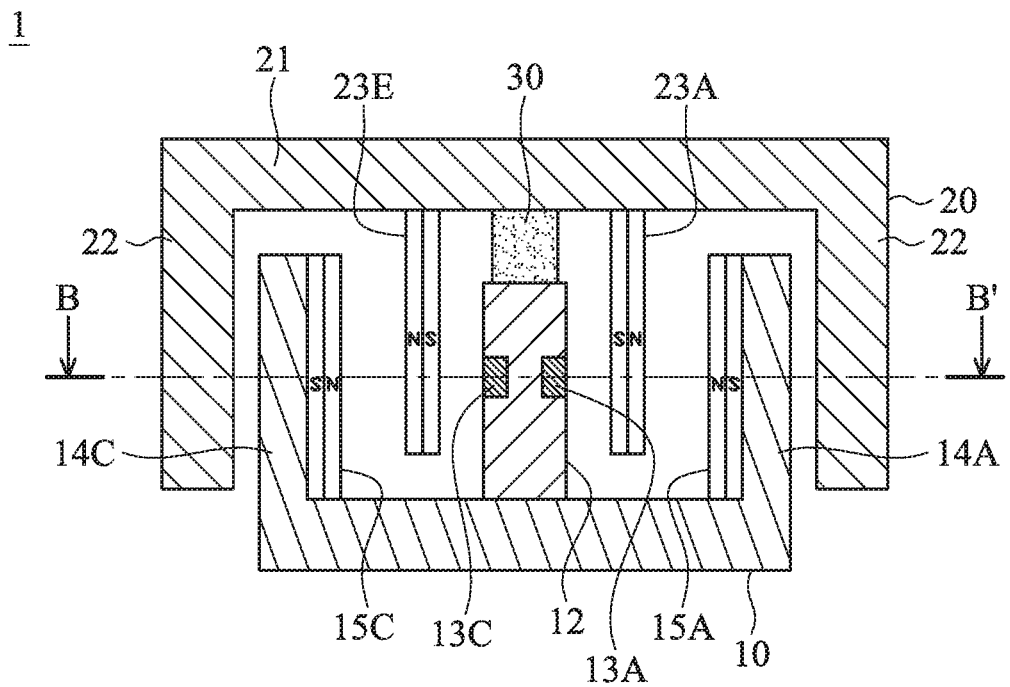
FIG. 4A is a longitudinal sectional view showing a rotary input device in accordance with another embodiment of the present invention.
Figure 4B:
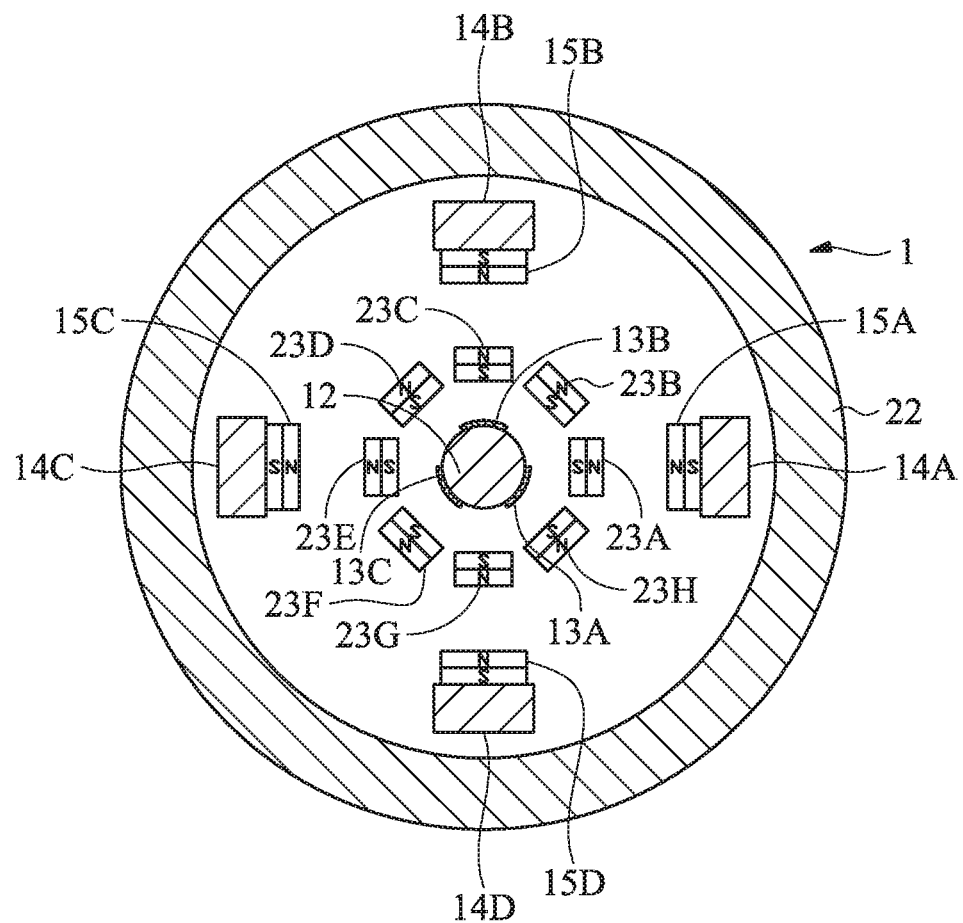
FIG. 4B is a plan view showing the cross section of the rotary input device of FIG. 4A taken along line B-B'.

In the above embodiment, one first magnet 23 is used to surround the column in a spiral manner. However, a plurality of magnets may be used to surround the column. FIG. 4A is a longitudinal sectional view showing a rotary input device in accordance with another embodiment of the present invention. FIG. 4B is a plan view showing the cross section of the rotary input device of FIG. 4A taken along line B-B'. In the present embodiment, the detailed structure of the rotary input device 1 is as shown in FIGS. 4A and 4B. The first magnet 23 of the foregoing embodiment is modified by a plurality of first magnets 23A to 23H having different magnetic field strengths, and the distance between the column 12 and any of the first magnets 23A to 23H is the same. The rest of the structure is the same as that of the embodiment of FIGS. 3A and 3B, and the same element symbol is denoted. As shown in FIG. 4B, eight first magnets 23A to 23H having different magnetic field strengths are arranged at equal intervals in the circumferential direction of the cover 20 in order of magnetic field strength. Each of the first magnets 23A to 23H faces the column 12 with the S pole of the magnet. Although the distance between the first magnets 23A to 23H and the magnetic sensors 13A, 13B, and 13C is not changed, since the magnetic field strength of each of the first magnets 23A to 23H itself is different, the magnetic sensors 13A, 13B, and 13C can also sense an increased or decreased magnetic signal when the rotary input device 1 is rotated. When the rotary input device 1 is pushed, some of the magnetic sensors 13A, 13B, and 13C senses an increased magnetic signal, and the remaining senses a decreased magnetic signal. Therefore, according to the same manner as the embodiment of FIGS. 3A and 3B, the signal processing circuit determines that the rotary input device 1 is rotated counterclockwise or clockwise (i.e., in FIG. 4B, the cover 20 is rotated counterclockwise or clockwise relative to the base 10) and outputs a counterclockwise rotation or a clockwise rotation signal to the external device. According to the same manner as the embodiment of FIGS. 3A and 3A, the signal processing circuit determines that the cover 20 of the rotary input device 1 is horizontally or obliquely moved relative to the base 10 in the upward, downward, leftward, and rightward directions, and outputs a movement signal to the external device. In other embodiments, the number of first magnets may also be increased or decreased according to different design considerations. The first magnets may be arranged at different intervals on the cover 20 in order of magnetic field strength. In other embodiments, a plurality of first magnets of the same magnetic field strength may also be disposed on the cover 20, and the distance between each of plurality of first magnets and the column is set to be uneven. This can also achieve the technical effects of the above embodiments.

Figure 5A:
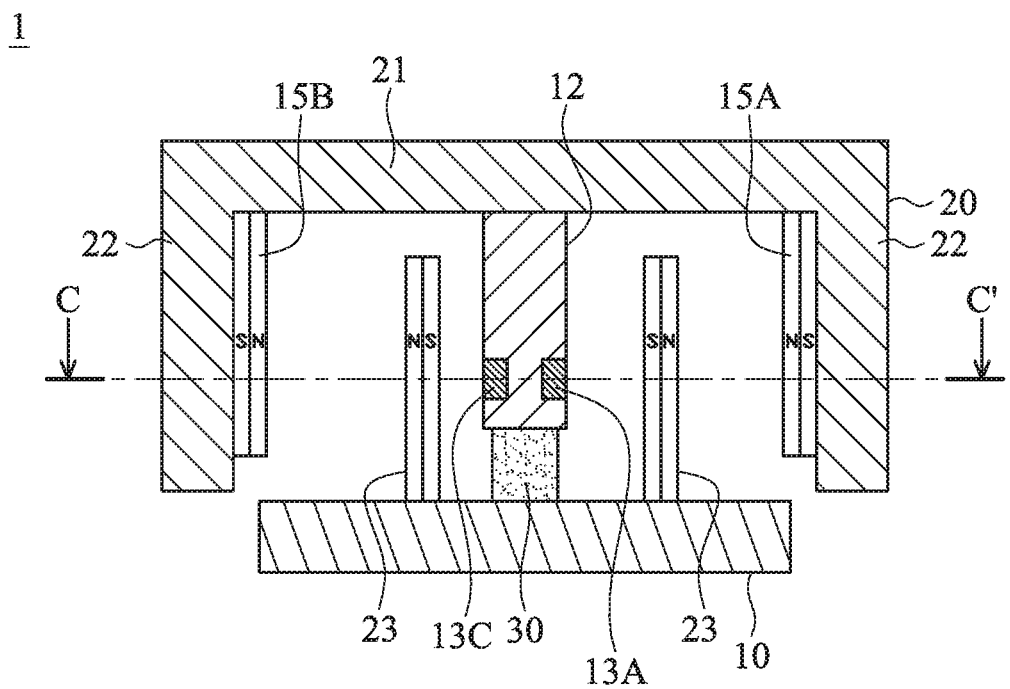
FIG. 5A is a longitudinal sectional view showing a rotary input device in accordance with another embodiment of the present invention.
Figure 5B:
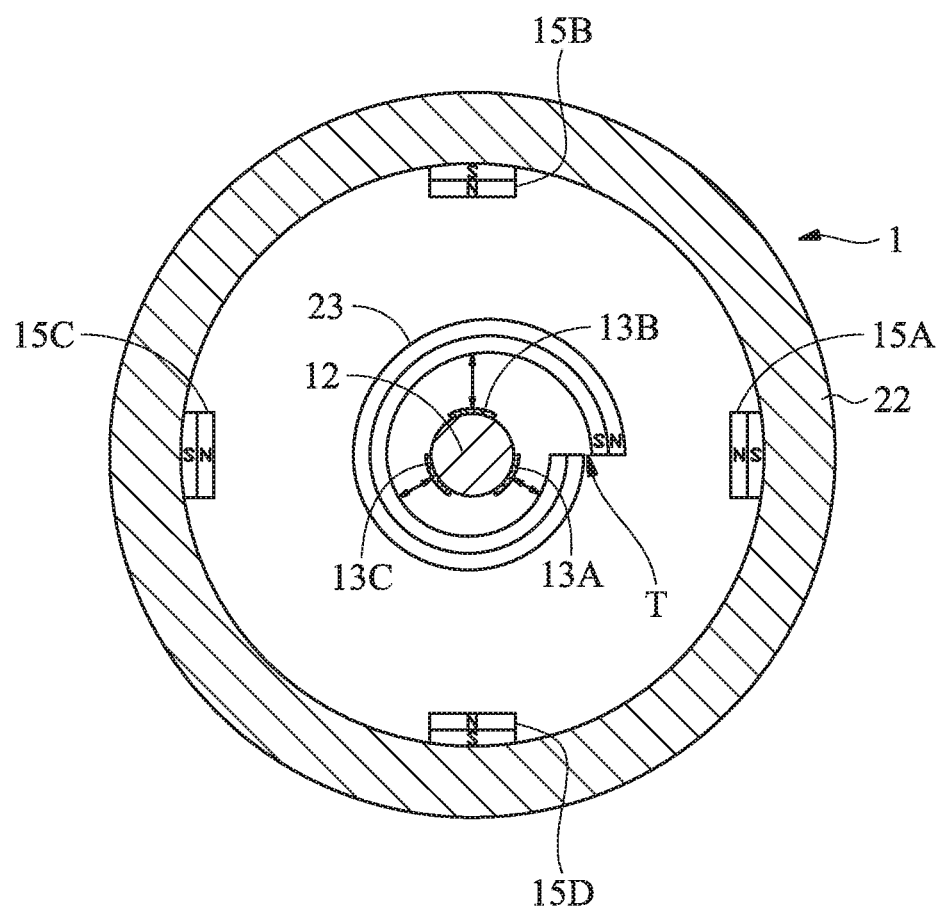
FIG. 5B is a plan view showing the cross section of the rotary input device of FIG. 5A taken along line C-C'.

FIG. 5A is a longitudinal sectional view showing a rotary input device in accordance with another embodiment of the present invention. FIG. 5B is a plan view showing the cross section of the rotary input device of FIG. 5A taken along line C-C'. In this embodiment, the detailed structure of the rotary input device 1 is as shown in FIGS. 5A and 5B, and the rotary input device 1 includes a base 10, a column 12, magnetic sensors 13A, 13B, 13C, a first magnet 23, a second magnet 15A, 15B, 15C, 15D, a cover 20, and a signal processing circuit (not shown). In the present embodiment, a first end of the column 12 is rotatably connected to the base 10, and a second end of the column 12 is fixedly connected to the cover 20. The base 10 and the cover 20 can be relatively moved horizontally or obliquely. In this embodiment, the base 10 and the column 12 are in a cylindrical shape. In other embodiments, the base 10 and the column 12 may be in other appropriate shapes or sizes (for example, a triangle or a square), only if the relative rotation between the cover 20 and the base 10 is not hindered.

In the present embodiment, the cover 20 includes a cap portion 21 and a side wall 22 vertically extending from the cap portion 21. The inner surface of the cap portion 21 is fixedly connected to the second end of the column 12, and the column 12 is surrounded by the side wall 22. The magnetic sensors 13A, 13B, and 13C can be implemented by a Hall sensor or the like, which outputs voltage accordingly according to the magnetic field strength that is sensed. The signal processing circuit can be implemented by a microprocessor, a microcontroller, a digital signal processor, and a special application integrated circuit. The signal processing circuit is coupled to the magnetic sensors 13A, 13B, and 13C. The signal processing circuit determines a corresponding signal that the rotary input device 1 should output based on the change in the output voltages of the magnetic sensors 13A, 13B, and 13C.

The base 10 and the column 12 may have an axis and a corresponding receiving hole (none of which are shown) to achieve a rotatable connection. In the present embodiment, the first magnet 23 is disposed along the circumferential direction of the column 12 to spirally surround the column 12. The first magnet 23 may be fixedly coupled to the base 10 by an adhesive or a connecting member. As shown in FIG. 5B, the first magnet 23 gradually approaches the column 12 in the counterclockwise direction. The side of the first magnet 23 facing the column 12 is disposed with the S pole of the first magnet 23, and the side of the first magnet 23 facing the side wall 22 is disposed with the N pole of the first magnet 23. The magnetic field strength of the first magnet 23 on the side facing the column 12 is set to be uniform. The magnetic field strength sensed by the magnetic sensors 13A, 13B, and 13C is mainly determined by the distance between the magnetic sensors 13A, 13B, 13C, and the first magnet 23. In other embodiments, the first magnet 23 may be arranged in such a manner as to gradually approach the column 12.

In the present embodiment, the second magnets 15A, 15B, 15C, and 15D are provided on the inner circumferential surfaces of the side wall 22, respectively. The second magnets 15A, 15B, 15C, and 15D and the first magnets 23 are opposed to each other by the same magnetic pole, that is, when the S pole of the first magnet 23 faces the column 12 and the N pole faces outward, each of the second magnets 15A, 15B, 15C, and 15D faces the first magnet 23 with an N pole. In another embodiment, the second magnets 15A, 15B, 15C, and 15D may be replaced by a single ring-shaped magnet. In another embodiment, the second magnets 15A, 15B, 15C, 15D may be directly connected to the cover portion 21 of the cover 20, and may be fixed by an adhesive or a connecting member. In another embodiment, the second magnets 15A, 15B, 15C, 15D may be implemented using a single ring-shaped magnet.

In the present embodiment, an elastic body 30 is further disposed between the column 12 and the base 20. When the cover 20 is pressed, the base 10 and the cover 20 can approach each other by the compression elastic body 30. In addition, the rotary input device 1 may further include a push switch (not shown) electrically connected to the signal processing circuit for detecting a pressing operation of the user, so that the signal processing circuit can output a pressing signal accordingly. For example, the push switch can be disposed at the elastic body 30. When the user presses the cover 20, the elastic body 30 is compressed so that the distance between the cover 20 and the base 10 becomes close and the push switch is triggered. The signal processing circuit determines that the push switch is triggered, and outputs a pressing signal accordingly. When the pressing force applied to the rotary input device 1 disappears, the base 10 and the cover 20 are returned to the preset distance due to the elastic force of the elastic body 30, and the push switch is in an un-triggered state.

In a state where the rotary input device 1 is not applied with a force (in a state not operated by the user), as shown in FIG. 5A, sensing surfaces of the magnetic sensors 13A, 13B, and 13C (i.e., areas of the magnetic sensors 13A, 13B, and 13C that are mainly used for detecting the magnetic field) faces the first magnet 23. As also shown in FIG. 5B, the first magnet 23 has a spiral structure that gradually approaches the column 12 along the counterclockwise direction. The magnetic field strength sensed by the magnetic sensors 13A, 13B, and 13C is varied by the distance between the sensing surface of the magnetic sensor 13 and the helical first magnet 23. The closer the magnetic sensors 13A, 13B, and 13C are to the helical first magnet 23, the stronger the magnetic field strength is sensed and the lower the voltage that is output. Conversely, the farther the magnetic sensors 13A, 13B, and 13C are from the helical first magnet 23, the weaker the magnetic field strength is sensed and the higher the voltage that is output.

In the embodiment of FIG. 5B, when the user rotates the rotary input device 1 in the clockwise direction, the cover 20 rotates clockwise relative to the base 10, and the column 12 rotates clockwise with the cover 20 (different from the embodiment of FIG. 3B). The distance between the magnetic sensors 13A, 13B, 13C and the first magnet 23 is gradually increased, the magnetic field strength sensed by the magnetic sensors 13A, 13B, and 13C is gradually decreased, and the corresponding magnetic signal (i.e., the output voltage) is gradually increased. According to the gradual increase of the magnetic signal output by the magnetic sensors 13A, 13B, and 13C, the signal processing circuit accordingly outputs a clockwise rotation signal to the external device. In addition, in order to improve the accuracy of the detection, the magnetic sensors 13A, 13B, and 13C can be set to sense the weakened magnetic field strength at least two consecutive times, so that the magnetic sensors 13A, 13B, and 13C increase the magnetic signal at least two consecutive times. Then the signal processing circuit determines that the rotary input device 1 is rotated in the clockwise direction and outputs a clockwise rotation signal to the external device. On the other hand, when the user rotates the rotary input device 1 in the counterclockwise direction, the cover 20 rotates counterclockwise relative to the base 10, and the column 12 rotates counterclockwise with the cover 20. The distance between the magnetic sensors 13A, 13B, 13C, and the first magnet 23 is gradually decreased, the magnetic field strength sensed by the magnetic sensors 13A, 13B, and 13C is gradually increased, and the corresponding magnetic signal (i.e., the output voltage) is gradually decreased. According to the gradual decrease of the magnetic signal output by the magnetic sensors 13A, 13B, and 13C, the signal processing circuit accordingly outputs a counterclockwise rotation signal to the external device. In addition, in order to improve the accuracy of the detection, the magnetic sensors 13A, 13B, and 13C can be set to sense the enhanced magnetic field strength at least two consecutive times, so that the magnetic sensors 13A, 13B, and 13C decrease the magnetic signal at least two consecutive times. Then the signal processing circuit determines that the rotary input device 1 is rotated in the counterclockwise direction and outputs a counterclockwise rotation signal to the external device. Furthermore, the signal processing circuit can also determine the rotation angle of the rotary input device 1 based on how much the magnetic signal output from the magnetic sensors 13A, 13B, and 13C has changed. At the end T where the first magnet 23 is farthest from and closest to the column 12, the change in the distance between the magnetic sensors 13A, 13B, 13C, and the first magnet 23 is a sudden increase along the counterclockwise direction, which is different from that at the other portions that is monotonically decreased along the counterclockwise direction. Therefore, using an algorithm, the signal processing circuit can treat this region as a special case to output a correct clockwise rotation signal or a counterclockwise rotation signal. For example, only when the output voltages of the magnetic sensors 13A, 13B, and 13C are increased or decreased two consecutive times does the signal processing circuit determine whether to output a clockwise rotation signal or a counterclockwise rotation signal.

In the embodiment of FIGS. 5A and 5B, for example, when the user pushes the rotary input device 1 to the left side in the horizontal direction, the cover 20 moves horizontally or obliquely to the left side with respect to the base 10, and the column 12 follows the cover 20 moving to the left side (different from the embodiment of FIG. 3B). The magnetic sensor 13A senses a decreased magnetic field strength due to a increase in the distance between the first magnet 23 and the magnetic sensor 13A, and the magnetic signal output from the magnetic sensor 13A is increased. At the same time, the magnetic sensors 13B and 13C sense increased magnetic field strength due to the decrease in the distance between the first magnet 23 and the magnetic sensors 13B and 13C, and the magnetic signals output from the magnetic sensors 13B and 13C are decreased. The signal processing circuit correspondingly outputs a leftward movement signal to the external device in accordance with the increase and decrease of the magnetic signals outputted by the respective magnetic sensors 13A, 13B, and 13C. On the other hand, when the user pushes the rotary input device 1 to the lower side in the horizontal direction, the cover 20 moves horizontally or obliquely to the lower side with respect to the base 10, and the column 12 follows the cover 20 moving to the lower side. The magnetic sensor 13B senses an decreased magnetic field strength due to a increase in the distance between the first magnet 23 and the magnetic sensor 13B, and the magnetic signal output from the magnetic sensor 13B is increased. At the same time, the magnetic sensors 13A and 13C sense increased magnetic field strength due to the decrease in the distance between the first magnet 23 and the magnetic sensors 13A and 13C, and the magnetic signals output from the magnetic sensors 13A and 13C are decreased. The signal processing circuit correspondingly outputs a downward movement signal to the external device in accordance with the increase and decrease of the magnetic signals outputted by the respective magnetic sensors 13A, 13B, and 13C. That is, the signal processing circuit can determine that the rotary input device 1 is being moved according to decreased magnetic signals outputted from some of the plurality of magnetic sensors 13A, 13B, and 13C and increased signals outputted from the other of the plurality of magnetic sensors 13A, 13B, and 13C. Further, the signal processing circuit can determine the direction in which the cover 20 is moved relative to the base 10 according to from which of the magnetic sensors 13A, 13B, and 13C the increased magnetic signals and the decreased magnetic signals are output respectively. For example, when the magnetic signals of the magnetic sensors 13A and 13B increase, and the magnetic signal of the magnetic sensor 13C increases, the signal processing circuit determines there is a relative movement between the cover 20 and the base 10. Regarding the direction of the relative movement, the signal processing circuit can further judge based on the magnetic signals output by the magnetic sensors 13A, 13B, and 13C. In this embodiment, since the magnetic sensors 13A, 13B, and 13C rotate along with the column 12, the magnetic sensors 13A, 13B, and 13C can perform two magnetic sensing. In the first magnetic sensing (when the rotary input device 1 is not pushed), the positions of the magnetic sensors 13A, 13B, and 13C are judged based on the output voltages of the magnetic sensors 13A, 13B, 13C. In the second magnetic sensing (when the rotary input device 1 is pushed), the direction in which the rotary input device 1 is moved is judged based on the change in the respective output voltages of the magnetic sensors 13A, 13B, and 13C. When the external force moving the rotary input device 1 disappears, the second magnet 15A, 15B, 15C, and 15D are pushed back to the preset position due to the repulsive force generated between the N pole of the second magnet 15A, 15B, 15C, and 15D facing the inner side and the N pole of the first magnet 23 facing the outer side. The cover 20 is returned to the state in which the base 10 is not pushed.

Figure 6A:
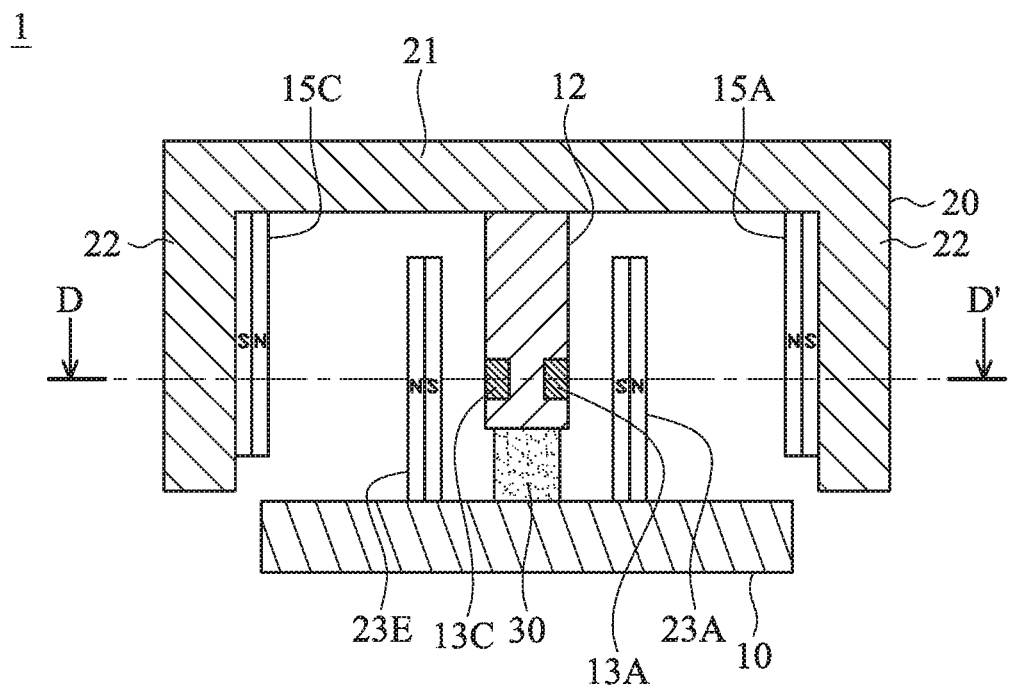
FIG. 6A is a longitudinal sectional view showing a rotary input device in accordance with another embodiment of the present invention.
Figure 6B:
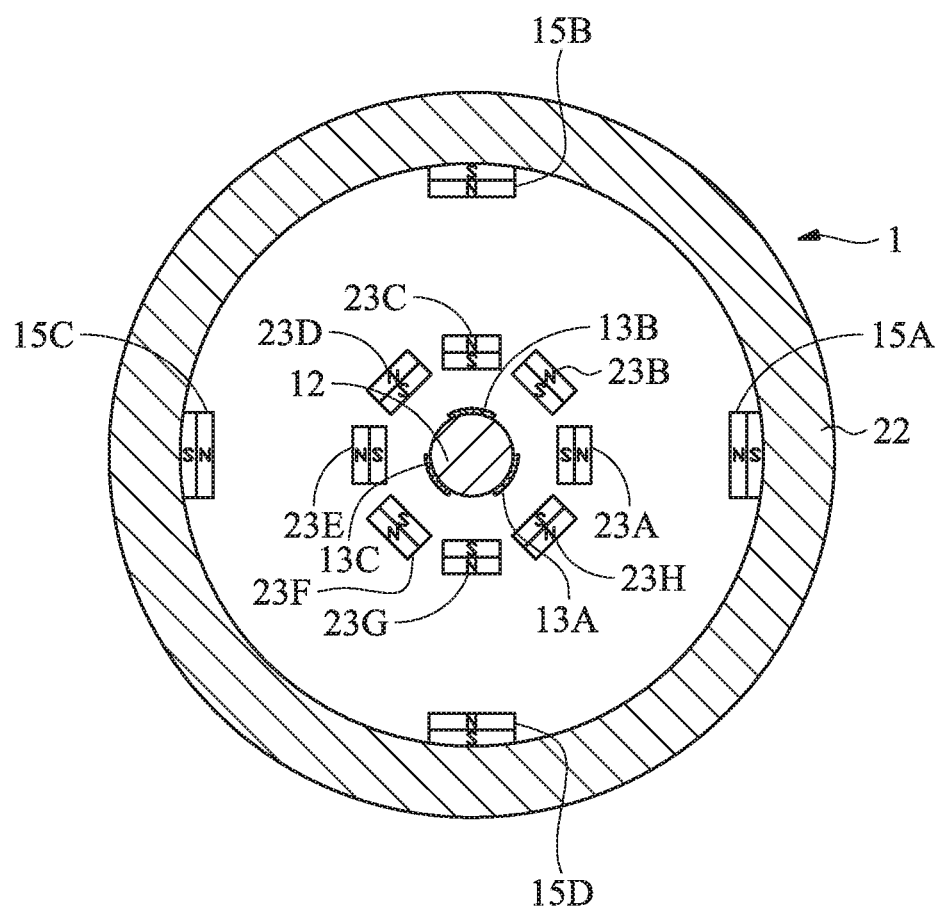
FIG. 6B is a plan view showing the cross section of the rotary input device of FIG. 6A taken along line D-D'.

FIG. 6A is a longitudinal sectional view showing a rotary input device in accordance with another embodiment of the present invention. FIG. 6B is a plan view showing the cross section of the rotary input device of FIG. 6A taken along line D-D'. In the present embodiment, the detailed structure of the rotary input device 1 is as shown in FIGS. 6A and 6B. The first magnet 23 of the foregoing embodiment is modified by a plurality of first magnets 23A to 23H having different magnetic field strengths, and the distance between the column 12 and any of the first magnets 23A to 23H is the same. The rest of the structure is the same as that of the embodiment of FIGS. 5A and 5B, and the same element symbol is denoted. As shown in FIG. 6B, eight first magnets 23A to 23H having different magnetic field strengths are arranged at equal intervals in the circumferential direction of the base 10 in order of magnetic field strength. Each of the first magnets 23A to 23H faces the column 12 with the S pole of the magnet. Although the distance between the first magnets 23A to 23H and the magnetic sensors 13A, 13B, and 13C is not changed, since the magnetic field strength of each of the first magnets 23A to 23H itself is different, the magnetic sensors 13A, 13B, and 13C can also sense an increased or decreased magnetic signal when the rotary input device 1 is rotated. When the rotary input device 1 is pushed, some of the magnetic sensors 13A, 13B, and 13C senses an increased magnetic signal, and the remaining senses a decreased magnetic signal. Therefore, according to the same manner as the embodiment of FIGS. 5A and 5B, the signal processing circuit determines that the rotary input device 1 is rotated counterclockwise or clockwise (i.e., in FIG. 6B, the cover 20 is rotated counterclockwise or clockwise relative to the base 10) and outputs a counterclockwise rotation or a clockwise rotation signal to the external device. According to the same manner as the embodiment of FIGS. 5A and 5A, the signal processing circuit determines that the cover 20 of the rotary input device 1 is horizontally or obliquely moved relative to the base 10 in the upward, downward, leftward, and rightward directions, and outputs a movement signal to the external device. In another embodiment, the number of first magnets may also be increased or decreased according to different design considerations. The first magnets may be arranged at different intervals on the base 10 in order of magnetic field strength. In another embodiment, a plurality of first magnets of the same magnetic field strength may also be disposed on the base 10, and the distance between each of plurality of first magnets and the column is set to be uneven. This can also achieve the technical effects of the above embodiments.

In the above embodiment, the rotary input device 1 may not be provided with a push switch. By appropriately setting the position between the magnet and the magnetic sensor, when the cover 20 is pressed to approach the base 10, the relative position of the magnetic sensors 13A, 13B, 13C and the first magnet 23 is misplaced. At this time, the signal processing circuit determines that the relative position of the cover 20 and the base 10 are relatively close according to the output voltage of the magnetic sensors 13A, 13B, and 13C, and outputs a pressing signal. For example, when the cover 20 is pressed, the magnetic sensors 13A, 13B, and 13C do not sense the magnetic field strength; or when the cover 20 is pressed, the magnetic sensors 13A, 13B, and 13C sense a different magnetic field strength which is not from the first magnet 23 (for example, setting a magnetic field strength to be stronger than the maximum magnetic field strength of the first magnet 23 or weaker than the minimum magnetic field strength of the first magnet 23).

Figure 7:
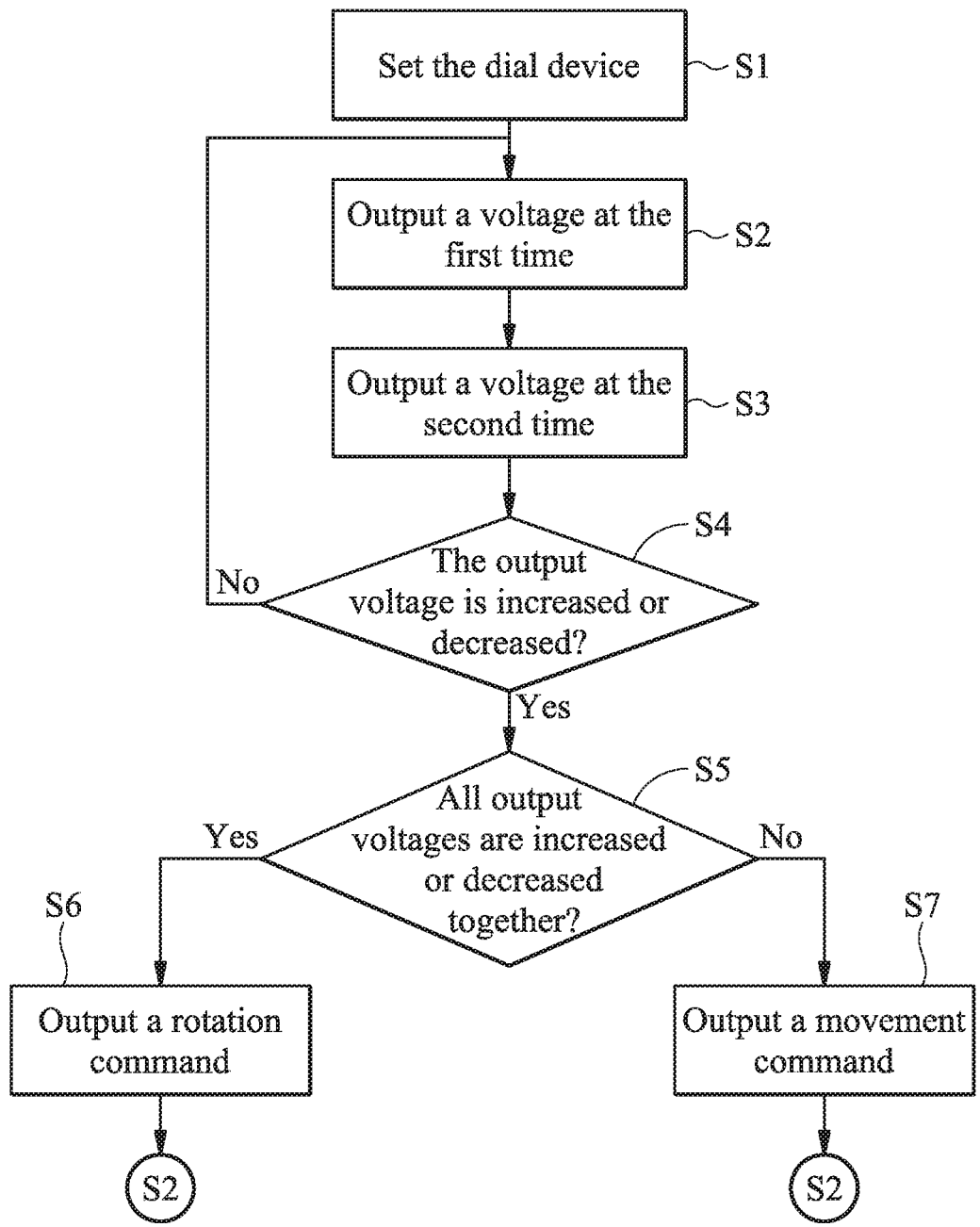
FIG. 7 is a flow chart showing the motion-detection method of the rotary input device according to the above embodiments.

Next, a motion-detection method for detecting the rotary input device of the present invention will be described. FIG. 7 is a flow chart showing the motion-detection method of the rotary input device according to the above embodiments. As shown in FIG. 7, in step S1, the rotary input device is placed on an external device having a touch screen and a connection is established. In step S2, the magnetic sensor performs magnetic sensing and outputs a voltage. Next, the process proceeds to step S3 to perform the next magnetic sensing, and the magnetic sensor outputs a voltage. Then, in step S4, it is judged whether or not the output voltage has increased or decreased in accordance with the voltage output in step S3 and the voltage output in step S2. If the voltage has not changed or the amount of change does not exceed a preset threshold value, then the process returns to step S2. If the voltage has increased or decreased, it is further determined whether all voltages output from the plurality of magnetic sensors are increased or decreased together in step S5. If all output voltages increase or decrease together, it means that the rotary input device has been rotated. The rotation command is output to the external machine in step S6, and the process returns to step S2 to continue the magnetic sensing. Here, the rotation command representing the rotation in a first direction (for example, the counterclockwise direction) may be output to the external device according to the increase of the output voltage, and the rotation command representing the rotation in a second direction (for example, the clockwise direction) may be output to the external device according to the decrease of the output voltage. If some output voltages increase and the other decrease, it means that the rotary input device has been moved. Therefore, the movement command is output to the external machine in step S7, and the process returns to step S2 to continue the magnetic sensing. Here, the movement command representing the movement in a certain direction (for example, the left direction) may be output to the external device according to the decrease of the output voltage from a certain magnetic sensor.

In the above embodiment, only three magnetic sensors 13A, 13B, and 13C are described. In other embodiments, the rotary input device 1 can also be implemented by using two or more magnetic sensors to detect the rotation direction and the relative movement direction between the cover 20 and the base 10. For example, in one embodiment, the rotary input device 1 is provided with two magnetic sensors. By placing two magnetic sensors on the cylinder of the column 12 to make the distance between the two magnetic sensors on the cylinder less than a half of circumference, the two magnetic sensors can be used to detect the horizontal or oblique relative movement of the cover 20 and the base 10 in a two-dimensional direction.

According to the above rotary input device and the motion detection method thereof, the invention increases the ways to operate the rotary input device, greatly improving the functionality and convenience of the rotary input device.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rotary input device, comprising
a base;
a cover having a cap portion and a side wall vertically extending from the cap portion;
a column surrounded by the side wall and having a first end for connecting to the base and a second end for connecting to the cover;
one or more first magnets surrounding the column and configured on either the base or the cover;
one or more second magnets surrounding the first magnets and configured on the other of the base or the cover;
a plurality of magnetic sensors configured on a lateral surface of the column; and
a signal processing circuit coupled to the plurality of magnetic sensors,
wherein when the cover is rotated relative to the base, the following operation will be performed:
the magnets rotate around the column and the magnetic sensors;
the magnetic sensors sense a plurality of magnetic signals having different values correspondingly; and
the signal processing circuit determines a relative rotation direction of the cover and the base according to the plurality of magnetic signals sensed by the magnetic sensors, and outputs a clockwise rotation signal or a counterclockwise rotation signal,
wherein when the cover is moved horizontally or obliquely relative to the base, the following operation will be performed:
a portion of the first magnets are moved close to the column, and the magnetic sensors sense the magnetic signals of the part of the magnetic sensors to be decreased;
the other portion of the first magnets are moved away from the column, and the magnetic sensors sense the magnetic signals of the other portion of the magnetic sensors to be increased; and
the signal processing circuit determines a relative movement direction of the cover and the base according to the plurality of magnetic signals sensed by the magnetic sensors, and outputs a movement signal.

2. The rotary input device as claimed in claim 1, wherein the first magnets are opposite to the second magnets with the same polarity.

3. The rotary input device as claimed in claim 1, wherein the first magnets comprise a single magnet that spirally surrounds the column.

4. The rotary input device as claimed in claim 1, wherein the first magnets comprise a plurality of magnets having the same magnetic field strength, and the plurality of magnets spirally surround the column.

5. The rotary input device as claimed in claim 1, wherein the first magnets comprise a plurality of magnets surrounding the column,
wherein the plurality of magnets are respectively the same distance from the column, and
the plurality of magnetic fields of the plurality of magnets monotonically increase or decrease in a clockwise direction.

6. The rotary input device as claimed in claim 1, wherein the column is fixedly coupled to the base and rotatably and movably coupled to the cover,
wherein the first magnets are disposed on the cover and surround the column, and the second magnets are disposed on the base and surround the first magnets.

7. The rotary input device as claimed in claim 1, wherein the column is fixedly coupled to the cover and rotatably and movably coupled to the base,
wherein the first magnets are disposed on the base and surround the column, and the second magnets are disposed on the cover and surround the first magnets.

8. The rotary input device as claimed in claim 1, further comprising:
a push switch electrically connected to the signal processing circuit and disposed between the cover and the column,
wherein when the cover is pressed to approach the base, the push switch is triggered, and the signal processing circuit determines that the push switch is triggered and outputs a pressing signal.

9. The rotary input device as claimed in claim 1, further comprising:
a push switch electrically connected to the signal processing circuit and disposed between the column and the base,
wherein when the cover is pressed and approaches the base, the push switch is triggered, and the signal processing circuit determines that the push switch is triggered and outputs a pressing signal.

10. The rotary input device as claimed in claim 1, wherein when the cover is pressed to be close to the base, the relative positions of the plurality of magnetic sensors and the first magnets are misplaced, and the signal processing circuit determines that a relative position of the cover and the base is closer according to the plurality of magnetic signals sensed by the plurality of magnetic sensors, and outputs a pressing signal.

11. A rotary input device, comprising
a base;
a cover having a cap portion and a side wall vertically extending from the cap portion;
a column surrounded by the side wall and having a first end for connecting to the base and a second end for connecting to the cover;

an elastic body configured either between the first end and the base or between the second end and the cover;

one or more first magnets surrounding the column and configured on either the base or the cover;

one or more second magnets surrounding the first magnets and configured on the other of the base or the cover;

a plurality of magnetic sensors configured on a lateral surface of the column; and a signal processing circuit coupled to the plurality of magnetic sensors.

12. The rotary input device as claimed in claim 11, wherein the first magnets are opposite to the second magnets with the same polarity.

13. The rotary input device as claimed in claim 11, wherein the first magnets comprise a single magnet that spirally surrounds the column.

14. The rotary input device as claimed in claim 11, wherein the first magnets comprise a plurality of magnets having the same magnetic field strength, and the plurality of magnets spirally surround the column.

15. The rotary input device as claimed in claim 11, wherein the first magnets comprise a plurality of magnets surrounding the column,
wherein the plurality of magnets are respectively the same distance from the column, and
the plurality of magnetic fields of the plurality of magnets monotonically increase or decrease in a clockwise direction.

16. The rotary input device as claimed in claim 11, wherein the column is fixedly coupled to the base and rotatably and movably coupled to the cover,
wherein the first magnets are disposed on the cover and surround the column, and the second magnets are disposed on the base and surround the first magnets.

17. The rotary input device as claimed in claim 11, wherein the column is fixedly coupled to the cover and rotatably and movably coupled to the base,
wherein the first magnets are disposed on the base and surround the column, and the second magnets are disposed on the cover and surround the first magnets.

18. The rotary input device as claimed in claim 11, further comprising:
a push switch electrically connected to the signal processing circuit and disposed between the cover and the column,
wherein when the cover is pressed to approach the base, the push switch is triggered, and the signal processing circuit determines that the push switch is triggered and outputs a pressing signal,
wherein when the cover is rotated relative to the base, the following operation will be performed:
the magnets rotate around the column and the magnetic sensors;
the magnetic sensors sense a plurality of magnetic signals having different values correspondingly; and
the signal processing circuit determines a relative rotation direction of the cover and the base according to the plurality of magnetic signals sensed by the magnetic sensors, and outputs a clockwise rotation signal or a counterclockwise rotation signal,
wherein when the cover is moved horizontally or obliquely relative to the base, the following operation will be performed:
a portion of the first magnets are moved close to the column, and the magnetic sensors sense the magnetic signals of the part of the magnetic sensors to be decreased;
the other portion of the first magnets are moved away from the column, and the magnetic sensors sense the magnetic signals of the other portion of the magnetic sensors to be increased; and
the signal processing circuit determines a relative movement direction of the cover and the base according to the plurality of magnetic signals sensed by the magnetic sensors, and outputs a movement signal.

19. The rotary input device as claimed in claim 11, further comprising:
a push switch electrically connected to the signal processing circuit and disposed between the column and the base,
wherein when the cover is pressed and approaches the base, the push switch is triggered, and the signal processing circuit determines that the push switch is triggered and outputs a pressing signal,
wherein when the cover is rotated relative to the base, the following operation will be performed:
the magnets rotate around the column and the magnetic sensors;
the magnetic sensors sense a plurality of magnetic signals having different values correspondingly; and
the signal processing circuit determines a relative rotation direction of the cover and the base according to the plurality of magnetic signals sensed by the magnetic sensors, and outputs a clockwise rotation signal or a counterclockwise rotation signal,
wherein when the cover is moved horizontally or obliquely relative to the base, the following operation will be performed:
a portion of the first magnets are moved close to the column, and the magnetic sensors sense the magnetic signals of the part of the magnetic sensors to be decreased;
the other portion of the first magnets are moved away from the column, and the magnetic sensors sense the magnetic signals of the other portion of the magnetic sensors to be increased; and
the signal processing circuit determines a relative movement direction of the cover and the base according to the plurality of magnetic signals sensed by the magnetic sensors, and outputs a movement signal.

20. The rotary input device as claimed in claim 11, wherein when the cover is pressed to be close to the base, the relative positions of the plurality of magnetic sensors and the first magnets are misplaced, and the signal processing circuit determines that a relative position of the cover and the base is closer according to the plurality of magnetic signals sensed by the plurality of magnetic sensors, and outputs a pressing signal.

* * * * *